United States Patent
Golyanskiy et al.

(10) Patent No.: US 10,457,022 B2
(45) Date of Patent: Oct. 29, 2019

(54) SINGLE- OR MULTILAYER FILM COMPRISING BONDED POLYVINYL ALCOHOL

(71) Applicant: OBSCHESTVO S OGRANICHENNOI OTVETSTVENNOSTYU "PROIZVODSTVENNO-KOMMERCHESKAYA FIRMA ATLANTIS-PAK", Aksayski rayon Rostovskaya obl. (RU)

(72) Inventors: Boris Vladimirovich Golyanskiy, Rostov-na-Donu (RU); Sergei Vladimirovich Verin, Rostov-na-Donu (RU); Olga Vladimirovna Zhavoronkova, Rostov-na-Donu (RU)

(73) Assignee: OBSCHESTVO S OGRANICHENNOI OTVETSTVENNOSTYU "PROIZVODSTVENNO-KOMMERCHESKAYA FIRMA"ATLANTIS-PAK, Aksayski rayon (RU)

( * ) Notice: Subject to any disclaimer, the term of this patent is extended or adjusted under 35 U.S.C. 154(b) by 0 days.

(21) Appl. No.: 15/755,664

(22) PCT Filed: Aug. 31, 2016

(86) PCT No.: PCT/RU2016/000591
§ 371 (c)(1),
(2) Date: Feb. 27, 2018

(87) PCT Pub. No.: WO2017/039490
PCT Pub. Date: Mar. 9, 2017

(65) Prior Publication Data
US 2018/0360055 A1 Dec. 20, 2018

(30) Foreign Application Priority Data
Sep. 1, 2015 (RU) .............................. 2015137304

(51) Int. Cl.
*C08L 29/04* (2006.01)
*B32B 27/30* (2006.01)
*B32B 1/02* (2006.01)
*A22C 13/00* (2006.01)
*C08J 5/18* (2006.01)
*B32B 27/08* (2006.01)
(Continued)

(52) U.S. Cl.
CPC ........ *B32B 27/306* (2013.01); *A22C 13/0013* (2013.01); *B32B 1/02* (2013.01); *B32B 1/08* (2013.01); *B32B 27/08* (2013.01); *B32B 27/16* (2013.01); *B32B 27/18* (2013.01); *B32B 27/22* (2013.01); *B32B 27/30* (2013.01); *B32B 27/34* (2013.01); *C08J 5/18* (2013.01); *C08K 3/16* (2013.01); *C08L 29/04* (2013.01); *C08L 77/00* (2013.01); *C09D 177/02* (2013.01); A22C 2013/0063 (2013.01); B32B 2274/00 (2013.01); B32B 2307/4026 (2013.01); B32B 2307/516 (2013.01); B32B 2307/518 (2013.01); B32B 2307/54 (2013.01); B32B 2307/716 (2013.01); B32B 2307/746 (2013.01); B32B 2439/70 (2013.01); B32B 2597/00 (2013.01); C08J 2377/02 (2013.01); C08J 2377/06 (2013.01); C08J 2429/04 (2013.01); C08K 5/053 (2013.01)

(58) Field of Classification Search
CPC .. B32B 1/02; B32B 1/08; B32B 27/30; B32B 27/306; B32B 27/34; C08L 29/04
See application file for complete search history.

(56) References Cited

U.S. PATENT DOCUMENTS

| | | |
|---|---|---|
| 4,611,019 A | 9/1986 | Lutzmann et al. |
| 5,051,222 A | 9/1991 | Marten et al. |

(Continued)

FOREIGN PATENT DOCUMENTS

| | | |
|---|---|---|
| EP | 2690963 B1 | 2/2014 |
| RU | 2232704 C2 | 7/2004 |

(Continued)

OTHER PUBLICATIONS

Kuraray, Mowiflex TC, Thermoplastic Processable Polyvinyl alcohol, Mar. 2011.

(Continued)

*Primary Examiner* — Walter Aughenbaugh
(74) *Attorney, Agent, or Firm* — Smartpat PLC

(57) ABSTRACT

A single- or multilayer film is disclosed, the film made on the basis of a blend of (co)polyamide and polyvinyl alcohol, soluble in at least one solvent A, comprising more than 50% water, at that said film comprising polyvinyl alcohol—PVAs, soluble in the same solvent A, and bonded polyvinyl alcohol—PVAB, which (i) is virtually insoluble in the same solvent A at temperatures from 18° C. to the initial boiling point at normal pressure, (ii) is soluble in at least one of the solvents, capable of dissolving (co)polyamide, (iii) gives the typical for PVA color reaction with iodine, and (iv) reacts with at least one primary amine, with formation of water-soluble PVA, wherein the CB/CS ratio, where CB is the film content for PVAB, that becomes water-soluble after its treatment with said primary amine, and Cs is the content of PVAs in the film, is not less than 0.05. When this condition is satisfied, there is noticeable improvement in the stability of the technological process of production, and in the mechanical strength of the film. The claimed film can be used, specifically, for sausage casings. 2 independent and 30 dependent claims, 6 tables.

15 Claims, No Drawings

(51) Int. Cl.
  *B32B 27/16* (2006.01)
  *B32B 27/18* (2006.01)
  *B32B 27/22* (2006.01)
  *B32B 27/34* (2006.01)
  *B32B 1/08* (2006.01)
  *C08K 3/16* (2006.01)
  *C09D 177/02* (2006.01)
  *C08L 77/00* (2006.01)
  *C08K 5/053* (2006.01)

(56) References Cited

U.S. PATENT DOCUMENTS

| | | |
|---|---|---|
| 5,317,052 A | 5/1994 | Ohba et al. |
| 7,070,731 B2 | 7/2006 | Kato et al. |
| 7,193,012 B2 | 3/2007 | Shibutani |
| 7,361,392 B2 | 4/2008 | Borodaev et al. |
| 7,727,604 B2 | 6/2010 | Schiffmann |
| 7,976,942 B2 | 7/2011 | Stalberg et al. |
| 8,563,057 B2 | 10/2013 | Schiffmann |
| 2005/0163948 A1 | 7/2005 | McGarel |
| 2006/0051466 A1 | 3/2006 | Delius et al. |
| 2006/0202397 A1 | 9/2006 | Stalberg et al. |

FOREIGN PATENT DOCUMENTS

| | | |
|---|---|---|
| RU | 2469541 C2 | 12/2012 |
| WO | 2012134347 A3 | 11/2012 |
| WO | 2014104946 A1 | 7/2014 |

OTHER PUBLICATIONS

Itogi Nauki., "Khimicheskie nauki. T. 7, M.", Izdatelstvo Akademii nauk SSSR, (19610000), pp. 247-249.

Kuraray Poval, "Moviflex Technical Data Sheet", Retrieved from https://www.kuraray.eu/fileadmin/Downloads/ Mowiflex/technical_data_sheets/TDS_Mowiflex_en.pdf on Feb. 26, 2018.

L. Incarnato, et al., J Polym Sci, Part B, Polym Phys, Influence of Composition on Properties of Nylon 6/EVOH Blends 37, 2445-2455, (1999).

S. De Petris, et al., Study of Blends of Nylon 6 with EVOH and Carboxyl-Modified EVOH and a Preliminary Approach to Films for Packaging Applications J Appl Polym Sci, 68, 637-647, (1998).

Ushakov S.N., "Polivinilovy spirt i ego proizvodnye. T. II", Leningrad: izdatelstvo AN SSSR, (19600000), vol. 598, No. 599, pp. 603-606.

SINGLE- OR MULTILAYER FILM COMPRISING BONDED POLYVINYL ALCOHOL

FIELD OF THE INVENTION

The present invention relates to single- or multilayer films comprising thermoplastic (co)polyamides and polyvinyl alcohol, provided that at least a part of the polyvinyl alcohol in composition of these films exists in the form of a product of unidentified structure denoted as «bonded polyvinyl alcohol». The invention also relates to methods for making of such type of films. The films according to this invention are particularly useful as casings for frankfurters, winners, small sausages of bockwurst type and also scalded-and-smoked, summer or dried sausages. These films as well can be used in other fields of art where a combination of useful properties of polyamide and polyvinyl alcohol blends and enhanced mechanical strength is desirable.

BACKGROUND OF THE INVENTION

Over the last decade permeable for water vapor and smoke melt-extrudable films based on synthetic resins mainly on polyamide resins, used as casings for smoked sausages and frankfurters were entered into a packaging market.

Single-layer smoke and water vapor permeable films based on polyamide resins such as poly-ε-caproamide (hereinafter referred to as PA6), copolymer of poly-ε-caproamide and poly hexamethylene adipamide (hereinafter referred to as PA6/66) and comprising 4 to 50 wt. % of hydrophilic compounds including water-soluble polymers such as polyvinylpyrrolidone (hereinafter referred to as PVP), polyvinyl alcohol (hereinafter referred to as PVA), that can form in polyamide matrix a highly dispersed phase with a linear size (thickness) of a domain of 0.1-3.0 μm (mcm), as well a method of making thereof was disclosed in patent RU No2182107, publ. 10 May 2002. They are characterized with relatively low cost (comparable with a level of conventional biaxially oriented polyamide film cost) and easy in production. Such films being used as sausage casings, allow preparing sausages, including frankfurters, having the pronounced features of smoking and a typical dense dark own skin (or a crust) on their surfaces.

Films, made of compositions with PVA as a hydrophilic compound are particularly easy in production and beneficial in point of in point of material cost. Such films were commercialized by Atlantis-Pak Ltd., as a product portfolio of smokable casings. Process of their improving led to recognition of the fact, that PVA content increasing results in growth of smoke- and water vapour permeabilities of these films, that is quite desirable in point of casing for smoked sausages performances. Meanwhile, mechanical strength of such casings decreases with the growth of PVA content. If it is more than 20%, such problems as bursts or breaks of these casings during their industrial high-performance and high-speed production as well in process of sausages and frankfurters stuffing into these casings often take place. And if casing additionally comprises such mechanically weak polymers, as, for instance, block-copolymers of polyamide and polyether, in a layer comprising PA and PVA, as disclosed in Patent RU No2333652, publ. 20 Sep. 2008, or in a layer not comprising PVA, above problems can arise even at lower PVA percentage.

Thus, the object of the present invention is a film, comprising (co)polyamide and PVA, particularly suitable for use as a casing for foods, but free of above drawback.

Terms and Definitions

Hereinafter in this description, the symbol «%» shall mean the mass percentage of the total mass of the composition or blend, unless otherwise specified, or unless otherwise unequivocally follows from context. Also, the words with a prefix in round brackets shall denote both the term expressed by the word with that prefix, and the term expressed by the word without that prefix. For example, the word (co)polyamide means both polyamide (homopolymer) and copolyamide. The abbreviation «PA» shall also equally denote polyamides and copolyamides.

The term «polymeric material based on a polymer» in the scope of the present description means either pure, neat (i.e. comprising no additive) polymer, or a composition, comprising this polymer in predominate amount.

Hereinafter the term «polyvinyl alcohol» or «PVA» relates to any polymer, chains or blocks which comprise at least 30% (molar) «vinyl alcohol» monomeric units. As a rule, they also comprise vinyl ester units, usually, units of vinyl acetate. They as well can comprise units of other monomers, having double Carbon-Carbon bond, mostly monomers of vinyl type, such as vinyl ethers, including ethers of vinyl and a polyglycol, or 3,4-diol-1-butene and the like. Such products were disclosed, for instance, in published on 13 Mar. 2003 Patent Application WO 03020823 and U.S. Pat. No. 8,026,302, published on 27 Sep. 2011, and they are marketed in form of thermoplastic compositions produced by Kuraray Europe GmbH (Trade Marks Mowiflex® of series) and Nippon Gohsei Europe GmbH (Trade Marks of G-Polymer series). Besides, in polymeric PVA chains carbonyl groups and double carbon-carbon bonds are present.

Polyvinyl alcohol, without regard to production method thereof, is characterized with typical identification test with iodine due to formation of colored complex compound PVA-I2. Similar coloration can be observed in interaction of iodine with starch, but unlike starch PVA maintains this property even after boiling in acidic aqueous medium, where starch is rapidly subjected to hydrolysis up to products incapable of being colored with iodine.

Usually polyvinyl alcohols are prepared by full or partial hydrolysis (saponification or alcoholysis) of polyvinyl acetate or some copolymers thereof. Hereinafter such products are referred to as «unmodified polyvinyl alcohols». In addition, PVA can be subjected to post-hydrolysis treatment changing its chemical structure resulting in formation of product, which hereinafter is referred to as «modified polyvinyl alcohol». Such the treatment comprises, without limitation, treatment by chemicals, for instance, oxidants, acylating or alkylating agents, treatment by α-, β- and γ-radiation, e-beams or electromagnetic irradiation within the range from microwave to X-rays, etc., and also heat and ultrasonic treatment. The above treatment can be a stage of production process for invented films or also can be accomplished by manufacturer of PVA sold as a commercial product.

In particular, PVA, used as a starting material for invented film making, can be any commercial product that is denoted by the its manufacturer, distributor or seller as, for instance, «polyvinyl alcohol», «polymer of vinyl alcohol», «vinyl alcohol resin», regardless of its precise composition and production method thereof providing that it is soluble in at least one solvent, comprising more than 50% of water.

The term «cross-linked polyvinyl alcohol» or «cross-linked PVA» hereinafter means PVA, macromolecules of which are linked by transversal covalent bonds through an oxygen atom or through «bridgee» groups of cross-linking agent, forming macrobody infusible and insoluble in any solvent, with a size, which makes it visible to a naked eye.

The term «gel» hereinafter means infusible inclusion in film, visible to a naked eye. (Chemical Encyclopedia: in 5 v. —Moscow: Soviet Encyclopedia, 1988. —v. 1. —p. 513).

The term «soluble» hereinafter relates to a product, the product, being brought in contact with specified solvent in specified conditions, passes into true or lyophilic colloidal solution in amount of at least 95% of total mass thereof.

The term «actually insoluble» hereinafter relates to a product, the product, being brought in contact with specified solvent in specified conditions, passes into true or lyophilic colloidal solution in amount of at most 1% of total mass thereof.

The term «(co)polyamide» hereinafter means any synthetic polymer, comprising in its backbone chain repeating amide groups —C(O)NH—.

The term «(co)polyamide of AB type» hereinafter means product of (co)polymerization and/or (co)polycondensation of one or more lactams and/or amino acids in absence of diamine and/or dicarboxylic acids as a comonomers or initiators of polymerization (see, for example, Nylon Plastics Handbook, edited by M.I. Cohan, NY: Hanser Publisher, 1995. C. 5). Macromolecules of AB (co)polyamides are characterized with having of one terminal carboxylic acid group and one terminal amino group.

The term «concentrated acid» hereinafter relates to chemical with pure acid content at least 90% (for instance, formic acid, of category «pure» (pur.) or «pure for analysis» (p.a.) according to The State Standard (GOST) No5848-73 or so called «glacial acetic acid» according to The State Standard (GOST) No61-75).

DESCRIPTION OF THE INVENTION

As a result of intensive studies, it was surprisingly found that the object of the present invention is achieved by single- or multilayer film, made of polymeric starting raw materials, comprising as obligatory components at least one (co) polyamide and at least one polyvinyl alcohol, soluble in at least one solvent, comprising more than 50% of water (hereinafter referred to as solvent A), and which comprises polyvinyl alcohol, soluble in the same solvent A (hereinafter referred to as $PVA_S$), and a product of unidentified structure denoted as «bonded polyvinyl alcohol», bonded PVA or $PVA_B$, which is (i) actually insoluble in the same solvent A that can dissolve $PVA_S$, at the range from 18° C. to initial boiling point at normal atmospheric pressure, (ii) soluble in at least one solvent B, dissolving (co)polyamide, (iii) gives a typical for PVA reaction of coloration with iodine and (iv), can react with, at least, one primary amine producing water soluble PVA; and ratio of content in the film of $PVA_B$, that becomes water soluble after its treatment with primary amine ($C_B$) to content of $PVA_S$ in the film ($C_S$), $C_B/C_S$ is at least 0.05.

It should be noted that because of changes of PVA structure that can occur at the process of films production $PVA_S$ present in film, can differ from initial PVA, used as a starting raw material. Solvent A able to dissolve both starting PVA and changed one preferably comprises more than 75% of water, nevertheless essentially pure (bidistilled, distilled, deionized and the like) water is quite suitable as a solvent for the most of PVA commercial grades. However there are PVA commercial grades with high content of vinyl alcohol units and/or with high blockiness, which poorly dissolve in water. Nevertheless, they can be readily dissolved, forming true solutions in water-alcohol mixture, comprising up to 50% of methanol or ethanol and also they can produce lyophilic colloidal solutions in water in presence of some surfactants. Apart from alcohols, such solvents as acetone or methyl acetate being in water can promote dissolving PVAs of these types.

The $PVA-I_2$ complex that is formed in interaction of PVA solutions with Lugol's iodine solution (solution of iodine in aqueous solution of potassium iodide) is blue, if PVA has degree of hydrolysis near 100%. If the degree of hydrolysis is lower, the color of the solution can vary from blue (color of complex of $I_2$c long blocks of «vinyl alcohol» units or randomly distributed units of both monomers) to red-violet (color of complex of $I_2$c long blocks of vinyl acetate units). However as it was shown by S. Hayashi et al., in the presence of boric acid and at sufficient dilution rate (at most 0.01%), PVA solutions show blue coloration regardless of degree of hydrolysis or blockiness of PVA (see «Blue Complex Formation of Poly(vinyl Acetate) with Iodine-Iodide»/S. Hayashi, T. Hirai, N. Hojo et al.//Journal of Polymer Science: Polymer Letters Edition. —1982. —Vol. 20, —P. 69-73).

Although structure of bonded PVA ($PVA_B$) is not ascertained exactly, it is definitely not cross-linked (net-like), because cross-linked products are insoluble in principle. Meanwhile $PVA_B$ can be dissolved, for example, in concentrated lower carboxylic acids such as, for instance, formic, acetic, propionic and acrylic acid, and also in solutions of some metallic chloride in lower alcohols, preferably, solutions of magnesium chloride and calcium chloride in lower alcohols, in some phenols, hot ($\approx 180°$ C.) glycerol, etc. The listed solvents are particular cases of solvent B, which, at the same time, can dissolve (co)polyamide. Besides, $PVA_B$ differs from any cross-linked polymer in its fusibility and in its feature of being in the film composition without gel formation.

$PVA_B$ becomes water soluble after treatment with a primary amine, such as, for example, ethylamine, propylamine, butylamine and especially monoethanolamine, the most convenient because of its law volatility. Moreover, other reagents splitting ester bonds can act in the same way. The list of such reagents comprises, among others, less active secondary amines, non-aqueous solutions or melts of caustic alkalis (hydroxides) or alkoxides of alkali metals.

The authors of present invention do not have reliable data about structure of the discovered product, denoted in the scope of present invention as bonded PVA or $PVA_B$. Without wishing to be limited to any one theory, they, nevertheless, believe, that the whole set of its properties gives grounds for supposition, that it is a polymeric product, which comprises both PVA block(s) and (co)polyamide block(s) in its macromolecules. In addition to that, it is most probable that the backbone chain of such macromolecule is PVA chain and one or more side chains of (co)polyamide are linked to this backbone chain by covalent links of one or another type, particularly, by ester links. As a variant, formation of macromolecules wherein two or more PVA chains are linked by polyamide «bridges», without appearing of large three-dimensional netlike structure is also possible. Such a supposition can explain the fact that this product resolves in those liquids, which can dissolve the both block-forming polymers, or at least the polymer forming «grafted» blocks, i.e. polyamide. Water or solvent A, which cannot dissolve (co)polyamide, but dissolving PVA, also cannot dissolve the discovered product. Such structure, comprising different blocks, to all appearance promotes localization of bonded PVA on the PVA/polyamide interface in the two-phase material of the invented film and provides enhanced bonding (or adhesion) between these phases that, in turn, makes mechanical properties of the film improved.

The invented film can comprise also small amounts of cross-linked PVA, shown as a low number (generally, less than 10 per square decimeter of film) of inclusions, visible to the naked eye.

Raw polymeric material used for the film production, preferably comprises from 30 to 98%, more preferably 60-90% of at least one (co)polyamide and preferably from 2 to 70%, more preferably from 10 to 40% of at least one PVA, soluble in solvent A.

In the preferable embodiment, the value of ratio $C_B/C_S$ is at least 0.1, more preferably at least 0.15 and even more preferably at least 0.25.

Preferable PVA, selected for use as a component of raw polymeric material, comprises in its macromolecules from 30 to 99% (mol) of vinyl alcohol units and 1 to 70% (mol) of units of at least one vinyl ester, preferably of vinyl acetate, and is characterized with viscosity of its 4% aqueous solution from 3 to 30 cP.

The most preferable PVA, selected for use as a component of raw polymeric material, comprises in its macromolecules from 45 to 90% (mol) of vinyl alcohol units and from 10 to 55% (mol) of vinyl acetate units and is characterized with viscosity of its 4% aqueous solution from 7 to 14 cP.

As a starting raw polymeric material can be also used PVA, macromolecules of which in addition comprise at least one of following structural elements: double carbon-carbon bonds in the backbone chain, carbonyl groups with carbon atom in the backbone chain, side polyol chains with a length in 2-5 carbon atoms, side polyglycol chains with molecular weight of at most 0.5 kDa.

The preferable (co)polyamides used as a component of the starting polymeric raw material can consist of aliphatic (co)polyamides, specifically linear aliphatic (co)polyamides, in particular comprising in their macromolecules units of at least one monomer selected from the group, comprising 4-aminobutyric acid, 5-aminovaleric acid, 6-aminocapronic acid, 11-aminoundecanic acid, 12-aminolauric acid, tetramethylenediamine, hexamethylenediamine, dodecamethylenediamine, adipic acid, azelaic acid, sebacic acid and dodecanedioic acid. Such (co)polyamides, for example, include PA 4, PA 6, PA 9, PA 46, PA 66, PA 69, PA 4/6, PA 4/9, PA 6/9, PA 6/46, PA 6/66, PA 6/69 or any blend thereof. Moreover, one can use (co)polyamides, mostly comprising units of the same aliphatic monomers of which above (co)polyamides are composed, but additionally comprising in their composition, at most 15% wt., units of at least one of such aromatic monomers as isophthalic acid, terephthalic acid, meta-xylylenediamine and para-xylylenediamine. The preferable (co)polyamides belong to the AB-type and include, e.g., PA 4, PA 6, PA 9, PA 4/6, PA 4/9, PA 6/9. The most preferable (co)polyamide for use is PA 6.

Besides, starting raw polymeric material can comprise at most 50% of total mass of other water insoluble thermoplastic polymers, such as, for instance, (i) polyolefins, maleated polyolefins, thermoplastic starches, as well as (ii) water insoluble cellulose esters, block-copolymers of polyamide and polyether, block-copolymers of polyester and polyether, block-copolymers of polyurethane and polyether, considering that the above polymers, separately or in any combination, can be present in any of the layers, including the layer(s) comprising or not comprising $PVA_B$. The polymeric materials from the group (i) can be present in the composition of any layer in total amount of 50% or less, while the content of the group (ii) materials is unlimited and can be as high as 100%.

Besides, starting raw polymeric material can comprise other water soluble polymers, for instance, polyvinylpyrrolidone, polyoxazoline, polyethylene oxide, cellulose ethers or any mixtures thereof, considering that these polymers, separately or in any combination, can be present in any layer, likewise in the total amount of 50% or less.

Raw polymeric material used for the film production can also comprise plasticizers, in the total amount of not more 20%, e.g., glycerol, 1.2-propylene glycol, polyethylene glycol with a molecular weight from 0.2 to 100 kDa, pentaerythritol, erythritol, xylitol, mannitol, sorbitol or any mixture thereof.

In general, the total number of layers in the invented film is limited only by the capabilities of the extrusion equipment used, however, the film usually comprises 1 to 12 layers, preferably 1 to 7 layers, and most preferably from 1 to 3 layers. The bonded polyvinyl alcohol can be comprised in one of its layers, or in several layers, or in all layers simultaneously.

The layer or layers not comprising PVA in any form preferably should be made of polymeric materials or blends characterized with highly permeability to water vapor and smoke components, e.g.:

a blend of (co)polyamides and water-soluble polymers, such as polyvinylpyrrolidone (PVP), high permeable block-copolymers comprising soft polyether (polyalkylene oxide, polyglycol) blocks, and hard blocks of such polymers as polyamide, polyester or polyurethane, or blends of at least one of said highly permeable block-copolymers and at least one of the components selected from (co)polyamides and water-soluble polymers.

The layers comprising $PVA_B$ or only $PVA_S$, can also comprise apart from polyamide such polymers as thermoplastic starch, water insoluble cellulose esters, and previously referenced highly permeable block-copolymers. In addition, PVA can form a separate layer or be present in the layers comprising the above listed polymers and not comprising polyamide, e.g., in a layer made of PVA/highly permeable block-copolymer blend.

Any of the layers of the invented film can also comprise the above plasticizers, as well as functional additives, depending on the expediency of their use, such as pigments, colorants, highly dispersed fillers, coarsely dispersed fillers, such as cellulose fibers, microcrystalline cellulose, cross-linked PVP, starch or dextrin, lubricants, slip additives, plasticizers, gas-emitting additives, stretching additives, PVA decomposition rate regulators, antiblocking agents for prevention sticking surfaces of the film while it is wound in a roll or transformed into a shirred stick, considering that the total amount of such additives taken in any combination in the film, generally does not exceed 20%.

The invented film can be unoriented or uniaxially oriented, but preferably it is biaxially oriented and thermoset. It can be made in the form of a flat expanded sheet, but preferably is a seamless tube in the form cylinder with a preferably straight or spiral axis (the shape of the tube becomes manifest when filled with air, water or another fluid), which is laid flat and wound in a roll or compacted into a shirred stick (also referred in patent documents as a strand or caterpillar). The film can have printed image on its surface, regardless of the supply form thereof.

The film advantageously differing from the prior art analogues by its improved mechanical properties is suitable for packaging of food products. The application of the invented film as an artificial casing for sausage is most preferable.

Production of the Film

Invented single- or multilayer film can be produced by different multistage processes, having common stage of melt (co)extrusion of this film, but differing in the stages of preparation of raw materials for the (co)extrusion and, optionally, in post-extrusion stages.

The starting raw polymer material, used for the films making, comprises as obligatory components at least one (co)polyamide, which generally is supplied in pelletized (or in other words, granulated) form, especially adapted for single-screw extruders, and at least one polyvinyl alcohol, soluble in at least one solvent A, comprising more than 50% of water, which generally is supplied in form of powder or fine grains, unsuitable for a single-screw extrusion.

Raw polymer material in form of pellets of certain size and shape implied for the direct use in the film single screw (co)extrusion, can comprise both commercial polymeric materials and pellets, made in the process of preliminary preparation of raw materials. As a preferable component of the whole pelletized raw materials for film (co)extrusion, pelletized materials comprising generally at least 10% of constituents listed below are supplied into at least one of extruders of the film (co)extrusion machine. The constituents are:

(a) a pelletized PVA/PA blend, prepared by melt-blending of (co)polyamide and a polymeric material based on polyvinyl alcohol, preferably for a time enough long for ratio $C_B/C_S$ of this blend (determined by the same method as for the invented films) to achieve a value at least 0.05 and preferably at least 0.1, more preferably at least 0.15 and most preferably at least 0.25, or;

(b) a mixture of pelletized (co)polyamide and pelletized carbonyl-modified polyvinyl alcohol (hereinafter referred to as $PVA_{CO}$), prepared by thermal or thermal-oxidative treatment of unmodified PVA, and characterized by a sufficiently high content of conjugated carbonyl groups in its chains (the criterion of such content is set out below), or;

(c) a mixture of (a) and (b) in any proportion.

Thus, $PVA_B$ is either added to the raw material of the invented film as component of pelletized composition, prepared in the stage of the thermal treatment and melt-blending of the composition, comprising (co)polyamide and PVA, or it is formed directly during film-making extrusion with the participation of raw material, comprising PVA subjected to preliminary thermal or thermal-oxidative treatment ($PVA_{CO}$).

Preparation of Raw Materials

Blends (compounds) of commercial unmodified PVA and polyamide are known in the prior art, however, such compounds are prepared by blending their melts within the shortest time possible to obtain a composition of satisfactory homogeneity, which can be achieved through the use of modern polymer extrusion mixers, e.g., as it was described in the RU Patent No2341090 published on 10 May 2006. However, as shown in one of the examples below, no significant amounts of $PVA_B$ are formed in the blends produced by this method.

Besides, the manufacturers of PVA-comprising extruded compositions and products usually strive to minimize its decomposition by limiting the treatment temperature and the time, during which it remains melted or just strongly heated, through control of the heat supply and abstraction (see, for example, U.S. Pat. No. 5,051,222, published on 24 Sep. 1991), or addition of thermal decomposition inhibitors and antioxidants to the melt, as, e.g., in the Japan Patent 6195054, published on 13 May 1986, or in the U.S. Pat. No. 5,317,052, published on 21 Feb. 2006.

However, the modified polyvinyl alcohols, subjected to preliminary thermal or thermal-oxidative treatment and comprising carbonyl groups conjugated with C=C double bonds in their chains, are known in the prior art. Such products are implied, primarily, for use as emulsifiers in aqueous systems, and have never before been introduced into thermoplastic blends with polyamide.

The level of PVA carbonyl modification can be estimated, e.g., by the optical density of its 0.1% solution measured at different wavelengths in the UV region corresponding to the absorption for the conjugated groups of different lengths, as recommended, e.g., in the U.S. Pat. No. 7,193,012, published on 20 Mar. 2007 and U.S. Pat. No. 8,222,325, published on 17 Jul. 2012.

In this description, however, the following method, based on measurement of the optical density in the visible part of the spectrum of the solution of 2,4-dinitrophenyl hydrazine and modified polyvinyl alcohol adduct (further referred to as DNPH-PVA adduct), which makes it possible to estimate the content of conjugated carbonyl groups, regardless of the conjugated chain length, is used. This method is based on the well-known fact that 2.4-dinitrophenyl hydrazine yields yellow-colored products (absorption at approx. $\lambda \approx 430$-$460$ nm) with saturated carbonyl compounds, and red/orange-colored products (absorption at approx. $\lambda \approx 480$-$500$ nm) with the compounds where the carbonyl group is conjugated with at least one C=C double bond. As a result of our experiments, it has been established that in order to achieve $C_B/C_S$ ratio in the film of at least 0.05 for the time required for passage of the PA and modified PVA-comprising blends through an industrial single-screw film-producing extrusion machine, it is necessary that the optical density of the DNPH-PVA adduct solution should be at least 0.1 at $\lambda=490$ nm, measured according to the method described below.

Production of Carbonyl-modified PVA

A possible technology for production of said pelletized $PVA_{CO}$, in the general case, requires thermal or thermal-oxidative treatment of unmodified PVA, using oxygen, preferably during a period from 20 seconds to 20 hours at a temperature from 90 to 250° C., and includes the stage of pelletizing of the PVA-based polymeric material in the presence of at least one plasticizer. Said unmodified PVA preferably has the degree of hydrolysis not lower than 30% and not greater than 75% based on molar percentage.

The stage of pelletizing, as in the case of unmodified PVA, includes melt blending of a composition comprising modified PVA and at least one plasticizer with the preferable mass ratio from 19:1 to 1.9:1 at a temperature about 160 to 250° C., generally for a period from 20 to 600 seconds. Such blending can be carried out in any suitable mixer for polymeric materials, though it is preferred to use to that end an extruder, most preferably a twin-screw extruder, preferably provided with several feeding ports and an evacuation zone.

Suitable plasticizers are either fed directly into the extruder through the corresponding opening, or are present in the polymeric material based on modified or unmodified PVA to be fed. Said plasticizers are added to the raw material at the additional stage of plasticizing that precedes the stage of pelletizing/thermal treatment, and consists in mixing of non-plasticized PVA using at least one plasticizer at a temperature of 45-100° C. to produce plasticized PVA in the form of loose agglomerate, which is then fed in the extruder/pelletizer. In the general case, such plasticizers are preferably selected from the group comprising glycerol, 1.2-propylene glycol, polyethylene glycol with a molecular weight from 0.2 to 100 kDa, pentaerythritol, erythritol, xylitol, mannitol, sorbitol, or any mixture thereof.

In addition to plasticizer(s), the composition fed into the extruder/pelletizer can comprise at most 40%, at least one additional thermoplastic polymer, such as thermoplastic starch, water insoluble cellulose ester, polyamide-polyether block-copolymers, polyester-polyether block-copolymers, and polyurethane-polyether block-copolymers.

The simplest way to transform unmodified PVA into $PVA_{CO}$ meeting the above optical density criterion by thermal decomposition of the former can be limited by the only stage of pelletizing, but this requires the PVA dwell time in the extruder significantly exceeding the minimum dwell time necessary to obtain the pelletized material and the blending process temperature preferably higher that is usually needed for plasticizing of the material. Typically, the dwell time is at least 300 seconds at a temperature of at least 200° C.

The thermal decomposition can be considerably accelerated, if the extruded composition comprises from 2 to 10% of at least one PVA thermal decomposition catalyst, the precise amount of which depends on the nature (type) of said catalyst. As a rule, such catalysts are represented by weak bases incapable to cause hydrolysis of the ester bonds in PVA. Such catalysts include, e.g., non-toxic weak alkali oxides, hydroxides or salts comprising anions of weak acids, such as acetic acid, N,N-dimethylglycine, and cations of metals of the group I or II, the catalytic action of which is described, e.g., in the U.S. Pat. No. 7,193,012. The most effective of these are magnesium acetate and magnesium oxide, the adding of which in the amount of just 2% and virtually in the absence of other catalysts, is already sufficient for formation of carbonyl groups conjugated with C=C double bonds in the amounts providing for conformance with the above criterion, within the time required for PVA pelletizing by means of an industrial twin-screw extruder, as shown in the examples below. Sodium acetate is just as effective for acceleration of thermal decomposition, but only with its total content at least about 6% in equivalent to anhydrous salt. Such salt is usually present, in the amount of 0.2-3.0%, in commercial PVA as admixture remaining after neutralization of the alkali catalyzing alcoholysis of polyvinyl acetate. As it is shown below, such PVA, in the process of pelletizing at the typical throughput of the extruder, is modified insufficiently (according to the criterion of optical density of the DNPH-PVA adduct), and when being melt-mixed with polyamide, cannot provide for formation of the required amount of $PVA_B$ during the usual time for production of PVA/PA pelletized blend and/or extrusion of the film.

Catalysts can be introduced into the pelletized material in the supplied form (pure), or in the form of solution in water or in a liquid plasticizer, or through a suitable feeding port of the extruder, or at the stage of preliminary preparation of said PVA loose agglomerate. In any case, it is expedient to perform the thermal treatment by melt-blending of the PVA-based polymeric material at a temperature from 160 to 250° C. during about 20 to 60 seconds.

Another approach to production of $PVA_{CO}$ consists in thermal-oxidative treatment of unmodified PVA powder, in the presence of elemental oxygen, at different temperatures, concentrations of oxygen and process times. Said elemental oxygen can be represented by diatomic oxygen either in its ground state (triplet), or in its lowest excited state (singlet)—the so-called «singlet oxygen», as well as by ozone. Suitable generators must be used to obtain the latter two unstable forms of oxygen.

E.g., a method is disclosed (U.S. Pat. No. 7,070,731), comprising a stage of thermal-oxidative treatment is carried out at a temperature of 90-180° C. during 0.5-20 hours in an atmosphere with the concentration of atmospheric oxygen not exceeding 8000 ppm. In particular, this method is used to obtain the products of the series PVA Poval L supplied by Kuraray Europe GmbH (Hattersheim-on-Main, Germany). After the pelletizing with a plasticizer described above, these products are suitable for use as said pelletized $PVA_{CO}$.

Another possible technique of thermal-oxidative treatment, which takes significantly less time, consists in the following two-stage treatment of unmodified PVA powder:

(1) first in an atmosphere comprising 5-30% v/v of oxygen in the form of diatomic gas in the ground triplet state, and 0.1-0.5 mg/m$^3$ of oxygen in the form of ozone at a temperature from 10 to 40° C. and relative humidity (further «RH») of the atmosphere from 80 to 90%, during 20 to 100 seconds, and then (2) in an ozone-free atmosphere with RH not higher than 40% and a temperature of 80-120° C., until a moisture content in the powder becomes not more than 5%, and preferably not longer than 10 minutes.

Such atmosphere can be represented by any suitable gas or gas mixture, e.g., atmospheric air, nitrogen, carbon dioxide, or any mixture of the above gases. Optionally, ozone used for this treatment can be partly or completely replaced with «singlet oxygen».

To all appearance, the first stage of this process causes rapid oxidation PVA, initiated by ozone, while the elevated humidity increases the gas permeability of PVA particles and facilitates penetration of the oxidizing gases deep into these particles. The second stage of this process provides not only for PVA drying, but also for complete removing of ozone, and the chemical elimination of water and acetic acid appears to start.

PVA oxidized by one or another method and pelletized with a plasticizer(s) commonly satisfies the selected criterion of optical density and is suitable for use as pelletized $PVA_{CO}$. To achieve a deeper modification of PVA (manifesting itself in greater values of the optical density of the DNPH-PVA adduct solution), during the pelletizing process, above mentioned thermal decomposition catalysts can be added to the oxidized PVA either through the corresponding feeding openings in the extruder, or at the stage of preliminary plasticizing.

Subject to achievement of the required value of said optical density, the pellets produced by any of the above methods are then fed directly into a single-screw extruder together with the required amounts of (co)polyamide and, optionally, other polymeric materials for production of the invented film.

PVA/PA Pelletized Blend

Practically all thermoplastic (co)polyamides can be used as the polyamide component to produce the PVA/PA pelletized blend; however, the above-listed AB-type polyamides are preferable. This type of nylons include, e.g., PA 4, PA 6, PA 9, PA 46, PA 66, PA 69, and copolyamides, e.g., PA 4/6, PA 4/9, PA 6/9, PA 6/46, PA 6/66, PA 6/69 or any mixtures thereof. Also suitable are (co)polyamides, preferably comprising in their macromolecules residues of the same aliphatic monomers, which compose the above-listed (co)

polyamides, but additionally comprising residues of at least one of such aromatic monomers as isophthalic acid, terephthalic acid, meta-xylylenediamine and para-xylylenediamine, in the amount of not more than 15% w/w. Any mixture of two or more of the listed polymeric materials can also be used.

The PVA/PA pelletized blend preferably should comprise at least one plasticizer selected from a list preferably including glycerol, 1.2-propylene glycol, polyethylene glycol with a molecular weight from 0.2 to 100 kDa, pentaerythritol, erythritol, xylitol, mannitol, and sorbitol. These plasticizers are either fed directly into the extruder through a suitable opening, or already present in the PVA-based polymeric material to be fed. In the latter case, the stage of melt-blending of the mixture in the extruder and its pelletizing is preceded by the additional, described in the foregoing section, stage of mixing of the PVA powder with at least one plasticizer at a temperature of 45-100° C. to obtain plasticized PVA in the form of loose agglomerate, which is then fed into the extruder/pelletizer. In addition, the composition comprising PVA and plasticizer(s) can be subjected to extrusion pelletizing, and only after that used as the pelletized PVA-based polymeric material for blending with polyamide and final pelletizing.

According to the invented method, in the general case, the above PVA/PA blend is prepared by melt-blending at a temperature of 180-250° C., and extruded in the form of a rod, which is then cut, after quenching, into pellets, the size and shape of which are suitable for use as raw materials for single-screw film-making extrusion. Formation of the necessary amount of $PVA_B$ in the blend generally takes from 20 to 900 seconds, depending on the temperature and the type of (co)polyamide, but chiefly on the presence or absence of the PVA thermal decomposition catalyst and upon the type of the initial polyvinyl alcohol. In particular, when unmodified commercial PVA is used in the absence of catalysts, the mixing time is usually at least about 270 seconds at a temperature of at least 220° C.

However, the use of above oxidized and/or thermally treated, optionally with the assistance of a PVA thermal decomposition catalyst, products in the form of pellets or agglomerated powder, optionally comprising said catalyst, as PVA-based polymeric material is even more preferred. The agglomerated powder based on commercial PVA powder is also useful, especially if it comprises the necessary amount of such catalyst. Alternatively, the catalyst can be fed in the supplied form directly into the extruder together with commercial polyvinyl alcohol (with simultaneous feeding of plasticizers) or in the form of agglomerated powder or pellets based on such PVA. If such materials and products are used, the time required for melt-blending of the PVA/PA mixture at a temperature of 180-250° C. can be reduced to about 20-200 seconds, and preferably to 20-60 seconds, while the $PVA_B$ content can significantly grow.

As regards such component as $PVA_B$, which is not introduced into this mixture, it can, theoretically, be formed at melt-blending of PVA and (co)polyamide, and during both pelletizing, and film extrusion, through different mechanisms. For example, in the case of the preliminary prolonged melt-blending of polyamide and unmodified polyvinyl alcohol without catalysts, hypothetical copolymers comprising polyamide blocks covalently bonded with the PVA chain, are probably formed through the mechanism of common esterification or nucleophilic substitution with participation of the (co)polyamide terminal carboxyl groups and polyvinyl alcohol hydroxyl groups. These reactions are usually significantly slower, than when initiated by the alternative mechanisms described below. Such mechanisms can include addition of polyamide through the terminal carboxyl group by means of the double bond, earlier formed in the PVA chain at elimination of the molecule of water or acetic acid, especially when said double bond is conjugated with the carbonyl group (so called nucleophilic conjugate addition). Carbonyl groups, in their turn, can be formed in the PVA chain, e.g., by elimination of the molecule of water or acetic acid from the moiety with two adjacent hydroxyl groups (1.2-glycol moiety), by the main chain decomposition at the 1.2-glycol linkage, or oxidation of hydroxyl groups. There is also the possibility of PVA attachment to the polyamide chain through the polyamide amino group capable of combination/substitution reactions with a carbonyl group in the PVA chain. Such bond of azomethine type also appears to be decomposed under the action of a primary amine excess.

Apart from PVA and PA in themselves, decomposition catalysts and plasticizers, the PVA/PA blends can additionally comprise up to 20% of such products as polyglycol-polyamide block copolymers, polyglycol-polyether block copolymers, polyglycol-polyurethane block copolymers, water insoluble cellulose esters, cellulose fibers, microcrystalline cross-linked PVP, cellulose, thermoplastic starch and dextrin, as well as to up to 20% of at least one additive such as fillers, pigments, colorants, lubricants, anticonglomerating agents for pellets, or any mixture of the listed components.

Thus, $PVA_B$ is present in the invented film due to at least one thermal and/or thermal oxidative treatment, realized during the production of PVA or its processing, or during the preparation of raw materials for the film (co)extrusion. At least one thermal treatment can take place in the performance of the operations to make pelletized products from PVA and/or PVA/PA mixture by the method of extrusion, including melt-blending at a temperature of at least 160° C., followed by pelletizing. Although such operations for preparation of raw materials for subsequent (co)extrusion of a film on the basis of PA and PVA mixtures are known in the prior art, the extrusion process used to obtain the invented film is characterized by at least one of the following three, previously undisclosed features:

i. the value of at least one of the extrusion parameters, including the melt dwelling time of PVA or of the mixture of PVA and (co)polyamide, and the temperature of that melt, exceeds the minimum value of the corresponding parameter required to produce the pelletized product;

ii. the raw material for extrusion comprises from 2 to 10% of at least one PVA decomposition catalyst selected from non-toxic weak alkali oxides, hydroxides or non-toxic salts of group I and group II metals;

iii. the raw material comprises carbonyl-modified $PVA_{CO}$ obtained as a result of PVA thermal or thermal-oxidative (with participation of elemental oxygen) treatment; 4% solution of said $PVA_{CO}$, when mixed in the 1:25 volume ratio with saturated at 25° C. solution of 2.4-dinitrophenyl hydrazine in 2N hydrochloric acid, has the optical density, at 490 nm wavelength, of at least 0.1.

Others Types of Pelletized Raw Materials for Extrusion of the Invented Film

The all abovementioned polymers and additives in any combination can be components of other, not comprising $PVA_B$ or $PVA_{CO}$, pelletized materials to be fed into the extruder(s) of the machine to produce the invented film. Moreover, the pellets to be fed into the extruder for any of layers, can comprise at least one of the components selected from the group including (co)polyamides, unmodified PVA, polyolefins, maleic anhydride grafted polyolefins, the above water-soluble polymers, different from PVA, or any mechanical mixtures of variant pellets and/or pelletized melt-blends (alloys) of the listed components.

Process for the Production of the Film

Production of a tubular film usually comprises melt (co)extrusion of preferably preliminarily prepared thermoplastic polymeric raw materials in the form of a tube extruded through an annular die, and further this tube can be immediately blown with air to the desired diameter, cooled and wound up, in the form of unoriented film, in rolls. Another option is first to cast or blow the film as a relatively thick-walled tubular film-precursor, followed by quenching, and then to use it for further production of oriented film. Said thick-walled tubular film-precursor, usually called the primary tube, is further subjected to biaxial stretching at the temperature depending on the nature of the polymeric components of the film, using gas at a pressure above atmospheric and two pairs of nip rolls rotating at different speeds. The process for making of a tubular film terminated by this stage (except the winding of film in rolls) is generally known as the double bubble technique. The so-called triple bubble technique additionally includes the stage of annealing or thermosetting, which consist in short-time aging of the tube, usually blown with air, at a temperature of about 100-150° C., usually accompanied with its certain dimensional relaxation. The latter stage is needed to impart a dimensional stability at the room temperature and a moderate shrinkage values at elevated temperatures to the film. The invented film in its tubular embodiment can be produced by any of the described methods, but the most preferred method is that of triple bubble.

The tubular casing, especially biaxially-oriented, can also be produced in the form of a ring or spiral by a well-know method of one-sided heating of the blown tube.

The tubular casing can also be subjected to shirring for production of shined sticks.

The invented film in the form of a flat expanded sheet can be prepared by means of flat die extrusion, preferably followed by uniaxial or biaxial stretching by means of a tenter frame and/or two pairs of nip rolls rotating at different speeds. The flat oriented film obtained by this method can be further subjected to thermosetting.

Another method for making of the flat film according to the present invention involves cutting of the earlier produced tubular film in the machine direction into two extensive sheet films.

Moreover, a printed image can be applied on a surface of any of above-mentioned films by any appropriate printing method, preferably by flexography.

The following examples, provided exclusively for illustration of the present invention and without limitation of the scope of claims, disclose the most preferred embodiments of the present invention.

Examples of Embodiments of the Invention

For the qualitative identification and determination of the $C_B/C_S$ ratio two consistent procedures were developed. As it was reported above, $C_B$ is content of $PVA_B$, in a film, $PVA_B$ which is insoluble in water (or solvent A) and becomes water-soluble after its treatment with primary amines, in a film, and $C_S$ is the content of $PVA_S$, which is soluble in water (or solvent A), in the same film. The procedures are based on practically complete elimination of $PVA_S$ from the analyzed system. Such elimination is impracticable with the use of, e.g., simple extraction of samples, even in water or a suitable solvent A heated to the boiling point, because macromolecules have an extremely low diffusion rate, especially in a solid medium. The provided technique comprises a step of complete destruction of the polyamide matrix in the sample by its dissolution, which makes the components, soluble in a suitable solvent A, including $PVA_S$, accessible for subsequent extraction with that solvent, both in the process of dilution, and during the flashing of the produced loose and highly porous precipitate. Completeness of PVA elimination from the precipitate is confirmed by the absence of the typical reaction of PVA coloration with iodine (Chemical Encyclopedia in 5 volumes—Moscow: Sovetskaya entsiklopediya, 1988. —v. 3. —p. 618) in water medium during the repeat cycle of dissolution/precipitation.

The method for determination of the $C_B/C_S$ ratio is based on transformation of the $PVA_B$ present in the precipitate purged from the products soluble in a suitable solvent A, into a water-soluble form through the reaction with a primary amine, and comparison of the photometric characteristics of the solution of this solubilized PVA at the preset dilution level with the photometric characteristics of the PVA solution obtained by the same method from a sample not subjected to preliminary purging to remove $PVA_S$. As a result, the $PVA_B$ to $PVA_S$ ratio in the material (pellets, film, etc.) is determined. This method takes into account that the thermal treatment of PVA can cause its modification due to elimination of water and/or acetic acid from its macromolecules, oxidation, etc. Therefore, both the PVA soluble in a suitable solvent A, and the bonded PVA in the composition of films or pellets can be not quite equivalent to that initially taken as the raw material, differing in the chemical structure, molecular weight and physical characteristics, including optical properties. One can reasonably assume that such modification should affect $PVA_B$ and $PVA_S$ to the same extent. Likewise, they should be equally susceptible to modification during the treatment with amine in accordance with the methods described below, likely to involve additional saponification (aminolysis) of the residual acetyl groups. Consequently, the quantitative method can be realized without direct estimate of both PVA forms content in the film, otherwise the initial PVA would be needed for calibration, which would fall short of correctness.

Test Methods

The two following methods are applicable to the case, when $PVA_S$ is soluble in pure water. However, the first method can be easily adapted to other cases by replacement of water with a suitable solvent A, capable of dissolving a particular $PVA_S$ at the stage of precipitation of the products insoluble in formic acid, and removal of $PVA_S$ by flushing. The second method does not require replacement of the solvent at the stages following treatment with amine, because, as a result of elimination of all side ester bonds (of both the acetate groups, and the polyamide bonds), PVA is formed, from both $PVA_B$ and from any $PVA_S$, with the saponification degree of virtually 100% and soluble in water.

1. Qualitative Determination of the Presence of Bonded PVA

A sample (about 0.5 g) of the test material (pellets or film) is put into a 200 $cm^3$ flask provided with a magnetic stirrer and a reflux condenser. About 50 $cm^3$ of formic acid (grade P according to GOST 5848-73) are added, and the contents of the flask are mixed at a temperature of 40-50° C. until complete dissolution of the sample (or almost complete, if the material contains any components insoluble in the acid). After that, the contents of the flask are cooled to the room temperature (20-25° C.), and filtered through a glass filter (Schott filter) with the pore size of 10-16 μm (P16 according to ISO 4793) into a Bunsen's flask under vacuum or through another filter, resistant to the acid and with a similar pore size, and the filter is flushed with 10 $cm^3$ of formic acid. To the filtrate, transferred to a 500 $cm^3$ conical flask, about 100 $cm^3$ of distilled water are added, while mixing, and then about 50-60 $cm^3$ of 10% solution of NaOH are added until total neutralization of the acid (controlled by means of universal indicator paper or a pH-meter). After 12-hour aging of the precipitate, it is filtered by means of a membrane filter with a pore size of about 0.5 μm, and repeatedly flushed with distilled water. For the last flushing operations, water with a temperature of about 100° C. is used. The flush water is periodically checked for PVA indicated by greenish coloration (juxtaposition of the blue color of the PVA-iodine complex, and the yellow color of iodine in excess) in the presence of the iodine-containing solution produced by mixing of 30 $cm^3$ of 4% solution of boric acid (chemically pure) with 1 $cm^3$ of 0.1N iodine solution (prepared from fixanal). The flushing operation is repeated until the negative color reaction to PVA (yellow color of the flush water).

A small part of the precipitate is put into a test tube; said iodine-containing solution is added to about one third of the test tube, and shaken for 2 minutes. Presence of $PVA_B$ in the precipitate is indicated by its green coloration (again, because of juxtaposition of colors, because iodine is well absorbed by polyamide), while the supernatant maintains its yellow color. The remaining precipitate is dried in a drying cabinet at 80° C. for 2 hours and divided in two approximately equal parts. These parts are put into two flasks (No. 1 and No. 2) containing each 50 $cm^3$ of 20% solution of $CaCl_2$ in ethanol, and dissolved while mixing and, if needed, heating. About 1 g of monoethanolamine (further MEA) is added to the flask No. 2. The contents of both flasks are continually mixed at boiling with reflux for a period of 3 hours, then cooled to the room temperature, after which about 100 $cm^3$ of distilled water are added to each flask while mixing. The flasks are then closed with plugs and left for 12 hours for aging of the precipitate. Then about 2 $cm^3$ of the supernatant are taken from both flasks and mixed in a test tube with about 3 $cm^3$ of the aforementioned iodine-containing solution. Complete elimination of $PVA_S$ from the samples is confirmed by the absence of green coloration of the contents of the flask No. 1 (the liquid remains yellowish, because of the presence of iodine). The transfer of $PVA_B$, which became water-soluble under the action of the primary amine, to the supernatant in the flask No. 2, is indicated by green coloration thereof.

Thus, the developed method makes it possible to indicate the presence of a component insoluble either in room-temperature water (20-25° C.), or in hot water (up to 100° C.), and producing the typical of PVA color reaction with iodine, and reacting with primary amine to form water-soluble PVA among the formic acid-soluble components of the polymeric blend, containing (co)polyamide and $PVA_S$, from which the test sample was made. In the scope of the present description such product has been denoted above as bonded PVA, i.e., $PVA_B$.

2. Determination of the $C_B/C_S$ Ratio

Two doses of the test material (pellets or film), further denoted as dose No. 1 and dose No. 2, each with a mass of about 0.5 g, are weighed on an analytical balance with an accuracy of up to 0.0001 grams. Using the techniques described in the preceding section, the dose No. 1 is dissolved in formic acid; the solution is filtered and flushed with acid, then the water insoluble components are precipitated with water, the precipitate is thoroughly flushed with water, dried and dissolved in 20% solution of $CaCl_2$ in ethanol. This solution is also treated sequentially with MEA and water in excess. After the 12-hour aging, the precipitate is filtered and repeatedly flushed with distilled water; the filtrate and flush water are combined to obtain, in such manner, solution of the PVA, which is now in the water-soluble form as a result of the action of MEA on bonded PVA. This solution is put into a volumetric flask and its volume is added to 500 $cm^3$, then 2 $cm^3$ are taken as a sample, and 3 $cm^3$ of the aforementioned iodine-containing solution are added to the sample, after which a photocolorimeter is used to determine the optical density $D_{670}$ of this solution at the wavelength of 670 nm, relative to the blank iodine-containing solution diluted with distilled water in the 3:2 ratio by volume.

The dose No. 2 is dissolved in the aforementioned ethanol/$CaCl_2$ system; the obtained solution is filtered through a membrane filter and treated with a MEA in excess, just as the contents of the flask No. 2 (i.e., without prior elimination of soluble PVA). After that, water is added to the obtained solution, and the same operations are performed as for the dose No. 1, ending in preparation of 500 $cm^3$ of PVA solution. In this case, PVA includes both the now water-soluble $PVA_B$, and the initial $PVA_S$ contained in the dose No. 2. Then 9 portions of this PVA solution of volumes from 1 to 9 $cm^3$, with a step of 1 $cm^3$ are taken with a pipette; the portions are transferred into volumetric flasks and diluted with distilled water to 10 cm³, and 2 cm³ of each solution are taken. In addition, 2 cm³ of the undiluted PVA solution are taken. Volumes of 3 cm³ of the aforementioned iodine-containing solution are added to each taken portion and to 10 cm³ of distilled water. A certain value of relative concentration of the diluted solution A, calculated as the ratio of the initial and the final volumes of the solution at the dilution, and varying from 0 (blank iodine solution) to 1 (undiluted PVA solution) with step 0.1, corresponds to the every prepared solution. After that the optical densities $D_{670}$ for these solutions are determined by means of a photocolorimeter. By drawing the measurement data, a relationship between $D_{670}$ and A is plotted. Using the resulting plot (usually almost linear), the equivalent relative concentration $A_{Eq}$ point, wherein $D_{670}$ of the diluted PVA solution produced from the dose No. 2 is equal to the same of the PVA solution produced from the dose No. 1, is determined.

The ratio between the contents of $PVA_B$ and $PVA_S$ in the sample ($C_B/C_S$) is calculated by the formula:

$$C_B/C_S = \frac{A_{Eq}m_2}{m_1 - A_{Eq}m_2},$$

wherein $m_1$ and $m_2$ are the weights of the doses No. 1 and No. 2, respectively, $A_{Eq}$ is the equivalent relative concentration determined from the plot.

3. Determination of the Optical Density of the 2.4-dinitrophenyl Hydrazine/Modified PVA Adduct Solution Modified PVA or a composition containing modified PVA, is dissolved in distilled water to the intent that a solution containing 4% of pure modified PVA is obtained. 50 cm³ of saturated at the room temperature (~25° C.) solution of 2.4-dinitrophenyl hydrazine in 2N hydrochloric acid are added to 2 cm³ of the solution of modified PVA to prepare a test solution. A mixture of 2 cm³ of distilled water and 50 cm³ of said saturated solution of 2.4-dinitrophenyl hydrazine was prepared to be used as a blank test solution. The prepared mixed solutions are aged for 1 hour at room temperature, and then measurement of optical density at λ=490 nm (further «$D_{490}$») of the test solution relatively to the blank test solution is performed by means of a photo-colorimeter.

4. Mechanical Tests

Tensile tests of the rectangular film samples 20×50 mm have been performed in accordance with GOST 14236-81, using a universal test machine Shimadzu Autograph AGS-J, at the clips rate of 100 mm/min and at deformation in the longitudinal (machine) direction.

Examples

The films according to the present invention and the samples for comparative examples have been made with the use of the polymeric materials listed below and denoted for convenience as follows:

PVA1—polyvinyl alcohol of the grade Poval 8-88LA (Kuraray Europe GmbH, Germany), viscosity of 4% aqueous solution at 20° C. is about 7.5, hydrolysis degree is about 87%, ash content converted to $Na_2O$ is about 0.07% (corresponds to 0.18% $CH_3COONa$).

PVA2—polyvinyl alcohol of the grade BC-05 (Chang Chun Petrochemical Co. Ltd, Taiwan), viscosity of 4% aqueous solution at 20° C. is about 7.2, hydrolysis degree is about 73%, ash content converted to $Na_2O$ is about 0.4% (corresponds to 1.2% $CH_3COONa$).

L8—pelletized thermally treated PVA of the grade PVA Poval L8 (Kuraray Europe GmbH., Germany, Hattersheim-on-Main), with $D_{490} \approx 0.2$.

PA 6—polyamide 6 of the grade Ultramid® B33L (BASF SE, Germany).

PA 6/66—copolyamide 6/66 of the grade Ultramid® C33, (BASF SE, Germany).

PEBA—polyether-polyamide block copolymer of the grade Pebax MV1074 SA 01 (Arkema, France).

AB—antiblock masterbatch for PA 6 of the grade Polybatch® AB PA 3013 (A. Schulman Inc., Fairlawn, Ohio, USA).

PEG—polyethylene glycol of the grade PEG 1500 (Clariant AG, Switzerland).

Gl. —food-grade glycerol (Glaconchemie GmbH, Germany).

MgO—magnesium oxide according to GOST 4526-75, p.a. (Khimproduktsiya XXI Co., Russia).

Talc—food-grade ground talc according to TU 21-25-217-78 (OAO Shabrovskiy talkovyi kombinat, Russia).

Na acetate—sodium acetate trihydrate according to GOST 199-78, p.a. (Khimproduktsiya XXI Co., Russia).

Mg acetate—food-grade magnesium acetate tetrahydrate (Niacet, The Netherlands).

Series O Example. Production of Oxidized PVA (Further o-PVA1).

4 kg of PVA1 are placed in a conical dryer for powder materials provided with a heated agitator and a connected gas mixer, which includes pipelines for supply of conditioned air at the room temperature, dry hot air, and a gas mixture from the ozonizer connected with an oxygen cylinder.

During 5 minutes the dryer with the activated agitator is supplied with passing through the mixer at the rate of 10 l/min conditioned air at the temperature of ≈18° C. and RH≈88% (the initial temperature of PVA and air in the dryer≈24° C.). Then for following 30 seconds the gas mixer is supplied at the rate of 0.3 l/min with oxygen ozonized to such a degree that the content of ozone in the gas mixture supplied to the dryer is 0.3 mg/l. After that, the supply of ozonized oxygen and conditioned air is stopped, heating of the agitator is activated, and hot air at the temperature of ≈120° C. is supplied to the dryer at the rate gradually increasing from 1 to 20 l/s. After 7 minutes, the hot air supply and agitator heating are cut off, and the oxidized PVA, at agitation and supply of conditioned air at the temperature of ≈18° C. and RH≈35%, is cooled to the room temperature and dried. The obtained o-PVA1 is a product of yellow-orange color with humidity≈0.3% and $D_{490} \approx 0.14$.

Series AP and G Examples. Production of Agglomerated Plasticized PVA Powder (AP) and Pelletized PVA (G).

Compositions, formulations of which are shown in Table 1, are homogenized in a CW-200 E-400L mixer equipped with a blade-type agitator with variable rotational speed, a heating/cooling jacket, and a vacuum pump, to obtain agglomerated powders $AP_1$-$AP_7$.

For this purpose, the mixer is fed with such amount of PVA as to obtain 70 kg of agglomerated PVA powder. Hot water at the temperature of 75° C. is supplied to the jacket, and the agitation starts at a low speed (100 rpm). Then a liquid plasticizer (glycerol or a mixture of glycerol and PEG) is added, calculated based on the mixture composition and containing, if needed, a decomposition catalyst (sodium acetate, potassium acetate or magnesium oxide) and/or filler (talc) in the form of solution or suspension in water or in a liquid plasticizer. Further the mixture is agitated for 10 minutes at the speed of 180 rpm, with the temperature rising to 90° C. Then the agitator speed is reduced to 100 rpm and cold water at the temperature of 15° C. is supplied to the jacket, and agitation continues for 20 minutes. During this time, the temperature of the mixture falls to 30° C., after which agitation is stopped and the modified PVA, obtained in the agglomerated form, is unfed from the mixer.

For production of the powder $AP_3$, the liquid plasticizer is diluted with the equal volume of distilled water to ensure the dissolution of magnesium acetate. Agitation of the hot mixture continues at reduced pressure until the residual water content, controlled by the gravimetric method, reaches the value of 1.5%.

Agglomerated PVA, in terms of its physical state and appearance, is formed as loose dry-to-touch lumps of irregular shape with the mean linear size of 0.5-1.5 mm.

TABLE 1

Compositions of PVA-based agglomerated powders

| Powder | PVA1 | PVA2 | L8 | o-PVA1 | PEG | Gl. | Mg acetate | Na acetate | MgO | Talc |
|---|---|---|---|---|---|---|---|---|---|---|
| $AP_1$ | 80 | | | | 2 | 17 | | | | 1 |
| $AP_2$ | 76 | | | | 2 | 16 | | 5 | | 1 |
| $AP_3$ | 72 | | | | 2 | 15 | | | 10 | 1 |
| $AP_4$ | | 85 | | | 7 | 5 | 2 | | | 1 |
| $AP_5$ | | | 90 | | | 9 | | | | 1 |
| $AP_6$ | | | | 90 | | 9 | | | | 1 |
| $AP_7$ | | | | 90 | | 8 | | | 2 | |

For production of the pelletized materials PVA $G_1$ and $G_3$-$G_8$ high-productive twin-screw extruder SAJ 38 (supplied by Lanzhou Lantai Plastics Machinery Co., Ltd, Lanzhou, China), equipped with coaxial intermeshing corotating screws and homogenizing elements, with an electrical drive providing variable screw rotational speed, is used. The corresponding powders $AP_1$-$AP_7$ (see Table 2) are fed into a hopper of the extruder, melted and homogenized at the temperature and duration specified in Table 2. The resulting melts are extruded in the form of a rod with the diameter of 2.5 mm, which is cooled by air current and cut into separate cylindrical pellets, the average length of which is 3 mm. The pellets $G_2$ are prepared in a similar way, but using a low-productive twin-screw extruder Century ZSK-30 supplied by Coperion GmbH, Stuttgart, Germany.

The minimum dwell time of each material in the extruder, which depends on the type of such material, is determined by the following operations: after the feeding into the extruder of non-pigmented powder ($AP_1$-$AP_7$) and reaching steady extrusion regime (about 2 minutes), the extruder is fed through the empty hopper, with the previously prepared batch of the corresponding powder ($AP_1$-$AP_7$) containing a dry red pigment, and the time until appearance of the pigmented material at the output of the extruder is recorded.

TABLE 2

PVA pelletizing modes and characteristics of the products

| Pellets | Powder | Minimum dwell time, s | Maximum temperature, ° C. | $D_{490}$ |
|---|---|---|---|---|
| $G_1$ | $AP_1$ | 31 | 180 | 0.01 |
| $G_2$ | $AP_1$ | 310 | 210 | 0.11 |
| $G_3$ | $AP_2$ | 28 | 180 | 0.03 |
| $G_4$ | $AP_3$ | 33 | 180 | 0.10 |
| $G_5$ | $AP_4$ | 32 | 180 | 0.15 |
| $G_6$ | $AP_5$ | 30 | 180 | 0.24 |
| $G_7$ | $AP_6$ | 31 | 180 | 0.18 |
| $G_8$ | $AP_7$ | 30 | 180 | 0.26 |

Series B Examples. Production of PA 6/PVA Mixtures in the Pelletized Form

Pellets of PA 6 or PA 6/66, taken in the amount equal by weight, to that of the pellets obtained in the series G examples, or of the agglomerated powders $AP_4$ and $AP_7$, with the pellet (pellet/powder) mixture formulations specified in Table 3, are fed into the hopper of the SAJ 38 extruder (except for the $B_2$ and $B_3$ blends, fed into the Century ZSK-30 extruder). The mixed polymeric materials are melted and homogenized in the extruder at the temperature shown in Table 3, followed by production of pellets, uniform in the shape and size, by a method similar to that used for the pellets $G_1$-$G_8$. The minimum dwell time of the polymeric blend in the extruder is measured after reaching steady extrusion regime, by introduction into the empty hopper of the appropriate mixture, in which PA 6 or PA 6/66 have been replaced by the masterbatch of the grade Palamid® Red 35-8005, BASF SE, Germany (red pigment in PA 6), and recording the time required for the pigmented material to appear at the output of the extruder. The values of the $C_B/C_S$ ratio, measured according to the above test, for each of these blends in the pelletized form are shown in Table 3.

TABLE 3

Composition of PA 6/PVA blends, pelletizing modes and characteristics of the blends in the pelletized form

| PA6/PVA mixture | PVA-containing component (50%) | Polyamide component (50%) | Dwell time, sec | Maximum temperature, ° C. | $C_B/C_S$ |
|---|---|---|---|---|---|
| $B_1$ | $G_1$ | PA 6 | 35 | 230 | 0 |
| $B_2$ | $G_1$ | PA 6 | 280 | 250 | 0.10 |
| $B_3$ | $G_1$ | PA 6 | 605 | 250 | 0.22 |
| $B_4$ | $G_3$ | PA 6 | 29 | 230 | 0.01 |
| $B_5$ | $G_4$ | PA 6 | 31 | 230 | 0.07 |
| $B_6$ | $AP_4$ | PA 6 | 41 | 230 | 0.12 |
| $B_7$ | $G_2$ | PA 6 | 33 | 230 | 0.12 |
| $B_8$ | $G_5$ | PA 6 | 28 | 230 | 0.19 |
| $B_9$ | $G_6$ | PA 6 | 33 | 230 | 0.35 |
| $B_{10}$ | $G_7$ | PA 6 | 30 | 230 | 0.21 |

TABLE 3-continued

Composition of PA 6/PVA blends, pelletizing modes and characteristics of the blends in the pelletized form

| PA6/PVA mixture | PVA-containing component (50%) | Polyamide component (50%) | Dwell time, sec | Maximum temperature, ° C. | $C_B/C_S$ |
|---|---|---|---|---|---|
| $B_{11}$ | $AP_7$ | PA 6 | 31 | 230 | 0.42 |
| $B_{12}$ | $G_5$ | PA 6/66 | 30 | 220 | 0.15 |

Comparison of the data presented in Tables 2 and 3 shows the following regularity: if the $D_{490}$ value is less than 0.1, then achievement of the desired values of $C_B/C_S$ ratio for the pelletized blend requires an extended dwell time of the blend in the melted state, while if not, such values are achieved for a much shorter time of blending at highly-productive extrusion, regardless in twin-screw extruder/pelletizer or in film-making single-screw extruder.

Examples of Film Production

Embodiment Examples 1-11 and Comparative Examples 1-5 (Comp.) of Production of Monolayer Films In order to obtain the films a single-screw extruder with a single-layer extrusion head (D≈30 mm, L/D≈25) is used.

Raw materials for the films extrusion according to formulations shown in Table 4, are fed into the hopper of the extruder, then melted and homogenized. Further the melt is transferred into the head, where the melted extrudate is formed and extruded through the annular die in the form of primary tube, which is quenched with cold water having a temperature of 13-15° C. Then the solidified primary tube, which usually has the mean diameter of about 7 mm and the mean thickness of about 160 μm (for each composition), is transferred, by means a system with a pair of active nip rolls, to the hot water bath with the temperature about 90° C., where the tube remains for 2-4 seconds, and is further subjected to orientation stretching with the machine and transverse stretching factors of 2.5 and 3.7 respectively. Subsequent thermosetting of the produced oriented tubular film in the form of air-blown tertiary tube is carried out in tubular IR-heaters at a temperature of 135-140° C. during 3-6 seconds. In the process of thermosetting the produced tubular casing is relaxed with shrinkage in the machine direction with the factor of 1.10, while the cylindrical bubble diameter is maintained at the level of about 22.5-23.0 mm by means of appropriate adjustment of the rotational speed of the inlet and outlet pairs of the active nip rolls limiting the tertiary bubble. After thermosetting, the flat-collapsed tubular film is passed over the cooling roller to bring its temperature down to 25° C., and wound up in a roll at the speed of ≈150 m/min (for embodiment examples) and ≈75 m/min (for comparative examples). Making the films according to the most of the comparative examples was found to be possible only at the reduced speed (75 m/min), because during the orientation stretching at the production line speed of ≈150 m/min, the frequent ruptures of the bubble took place. The formulation according to 1st comparative example proved to be unable for processing into oriented film even at the reduced speed. All obtained tubular films have the diameter of ≈22 mm and thickness of 21-22 μm. Just as in the case of production of PVA/PA pelletized blends, the minimum dwell time for the material in the extruder was determined by replacement of the polyamide raw materials with Palamid® Red 35-8005, at the same extrusion productivity.

TABLE 4

Composition and extrusion parameters of single layer films

| Film of example No. | PA/PVA (share, %)* | PVA (share, %)* | Polyamide (share, %) | Others components (share, %) | Dwell time, sec | Maximum temperature, ° C. |
|---|---|---|---|---|---|---|
| 1 comp.** | — | $G_1$ (40) | PA 6 (58) | AB (2) | 45 | 230 |
| 2 comp. | — | $G_1$ (40) | PA 6 (58) | AB (2) | 90 | 230 |
| 3 comp. | $B_1$ (70) | — | PA 6 (28) | AB (2) | 90 | 230 |
| 4 comp. | — | $G_1$ (45) | PA 6/66 (38) | PEBA (15) + AB (2) | 90 | 210 |
| 5 comp. | $B_4$ (70) | — | PA 6 (28) | AB (2) | 90 | 230 |
| 1 | $B_2$ (35) | $G_1$ (17.5) | PA 6 (45.5) | AB (2) | 45 | 230 |
| 2 | $B_3$ (70) | — | PA 6 (28) | AB (2) | 45 | 230 |
| 3 | $B_6$ (70) | — | PA 6 (28) | AB (2) | 45 | 230 |
| 4 | $B_7$ (70) | — | PA 6 (28) | AB (2) | 45 | 230 |
| 5 | — | $G_5$ (40) | PA 6 (58) | AB (2) | 45 | 230 |
| 6 | $B_8$ (80) | — | PA 6 (18) | AB (2) | 45 | 230 |
| 7 | $B_9$ (80) | — | PA 6 (18) | AB (2) | 45 | 230 |
| 8 | $B_1$ (40) | $G_8$ (20) | PA 6 (38) | AB (2) | 45 | 230 |
| 9 | $B_{10}$ (70) | — | PA 6 (28) | AB (2) | 45 | 230 |
| 10 | $B_{11}$ (40) | $G_1$ (20) | PA 6 (38) | AB (2) | 45 | 230 |
| 11 | $B_{12}$ (70) | — | PA 6/66 (13) | PEBA (15) + AB (2) | 45 | 210 |

In all cases, except for the 1st comparative example, the film production process ran smoothly. Rolls, each containing 500 m of film, were obtained. In the first comparative example, the continuous ruptures of the tube during the orientation stretching prevented production of single layer tubular film. The films realized in the embodiment examples 1-3 and 5-10, as well as in the comparative examples 2, 3 and 5, were uniform in thickness and virtually free from unmelted inclusions, while the films made according to the example 11 and comparative example 4 had a certain amount (less than 10 per dm²) of «gels» in their body.

Samples were taken from the obtained films to determine the $C_B/C_S$ ratio. Then all these films were transformed into shirred sticks and sent to meat processors for stuffing and making of smoked frankfurters therein. The data concerning the final composition of the made films and their behavior when used as frankfurter casing are summarized in Table 5.

TABLE 5

Properties of prepared single layer films

| Film of example No. | Total PVA content, %* | $C_B/C_S$ | $\sigma_b$, MPa | $\varepsilon_b$, % | Behavior of film when used as sausage casing |
|---|---|---|---|---|---|
| 1 comp. | 32 | 0*** | — | — | |
| 2 comp. | 32 | 0 | 88 ± 14 | 95 ± 10 | massive ruptures during stuffing |
| 3 comp. | 28 | 0.02 | 92 ± 16 | 80 ± 12 | frequent ruptures during stuffing |
| 4 comp. | 36 | 0 | 74 ± 6 | 110 ± 20 | massive ruptures during stuffing |
| 5 comp. | 36 | 0.02 | 73 ± 8 | 112 ± 18 | frequent ruptures during stuffing |
| 1 | 28 | 0.06 | 108 ± 8 | 99 ± 10 | rare ruptures during stuffing |
| 2 | 28 | 0.23 | 135 ± 6 | 120 ± 4 | no ruptures during cooking and stuffing |
| 3 | 29.8 | 0.19 | 120 ± 6 | 112 ± 10 | no ruptures during cooking and stuffing |
| 4 | 28 | 0.12 | 115 ± 7 | 99 ± 9 | no ruptures during cooking and stuffing |
| 5 | 34 | 0.15 | 127 ± 8 | 133 ± 9 | no ruptures during cooking and stuffing |
| 6 | 34 | 0.33 | 138 ± 5 | 115 ± 11 | no ruptures during cooking and stuffing |
| 7 | 36 | 0.61 | 151 ± 3 | 130 ± 5 | no ruptures during cooking and stuffing |
| 8 | 34 | 0.53 | 148 ± 9 | 155 ± 8 | no ruptures during cooking and stuffing |
| 9 | 31.5 | 0.26 | 140 ± 4 | 120 ± 4 | no ruptures during cooking and stuffing |
| 10 | 34 | 0.34 | 148 ± 7 | 122 ± 8 | no ruptures during cooking and stuffing |
| 11 | 29.8 | 0.25 | 115 ± 5 | 198 ± 10 | no ruptures during cooking and stuffing |

*Based on the actually fed formulation.
**$\sigma_b$ and $\varepsilon_b$ - respectively, the tensile strength and the elongation at break.
***Result of analysis of the primary tube.

Embodiment Example 12 and Comparative Example 6 of Multilayer Film Production

Multilayer films are produced by the same technology as the described above single layer films, using an extrusion machine equipped with two separate extruders and a two-layer extrusion head. In the example 12 and the comparative example 6 the inner layer of the tubular film consists of the mixture of 48% PA 6, 2% AB and 50% PEBA, and accounts for about 50% of the total film thickness. The formulation of the outer layer of the tubular multilayer film in the example 12 coincides with the formulation of the single layer film according to the embodiment example 6, while the formulation in the comparative example 6 coincides with that of the single layer film of the comparative example 5. The film production process in the embodiment example 12 runs quite smoothly. As a result, rolls were obtained, each containing 500 m of casing. In the comparative example 6, an oriented tubular film could not be made, because of continuous ruptures of the tube during the orientation stretching. Samples of the produced film (example 12) and of the primary tube (comparative example 6) were taken for determination of the $C_B/C_S$ ratio. The film made in the embodiment example 12 was transformed into shirred sticks and sent to meat processors for stuffing and making of smoked frankfurters.

The details of the multilayer films are set out in Table 6.

TABLE 6

Properties of the prepared multilayer films

| Film of example No. | Total PVA content, %* | $C_B/C_S$ | $\sigma_b$, MPa | $\varepsilon_b$, % | Behavior of film when used as sausage casing |
|---|---|---|---|---|---|
| 6 comp. | 18 | 0.02*** | — | — | — |
| 12 | 17 | 0.32 | 110 ± 12 | 132 ± 15 | no ruptures during cooking and stuffing |

*Based on the actually fed formulation.
**$\sigma_b$ and $\varepsilon_b$ - respectively, the tensile strength and the elongation at break.
***Result of analysis of the primary tube.

Tables 5 and 6 show that the presence of bonded PVA, both in the single layer and in the multilayer films, in such amount that the $C_B/C_S$ ratio is not less than 0.05, improves the mechanical strength of both the primary tube and the ready-to-use film under the conditions of its utilization, specifically, as sausage casing, which is the technical result of the present invention. If the mass fraction of PVA in the film composition approaches 30% or, particularly, if it exceeds this value, while the $C_B/C_S$ ratio is less than 0.05, the single layer sausage casings either cannot be made at all, or become susceptible to frequent ruptures during their stuffing. If the $C_B/C_S$ ratio is less than 0.05, then even at a relatively small total content of PVA in the multilayer film and in the presence, in one of the layers, of polyester-block-polyamide, the mechanical strength of the film is unacceptably low and such multilayer film even cannot be made.

On the other hand, it can be concluded from the data of the tables that the prior art methods for making films based on PVA/polyamide blends, comprising any stages, which implied only short dwell time of PVA itself and/or PA/PVA blend in melted state, cannot cause formation of any appreciable amounts of $PVA_B$ in the resulted film and, consequently, the improvement of its mechanical characteristics. Such stages usually comprise preliminary pelletizing of PVA and/or preparing of pelletized PA/PVA blends. Quite the contrary, the prior art methods are intended to accomplish the processing of PVA-comprising materials in such a manner as to avoid its thermal or thermal oxidative decomposition, usually by minimizing of the above dwell time and processing temperature. Hence the newly invented technique, including stages that require the dwell time prolonged and/or provoke PVA oxidation and/or thermal decomposition reactions catalyzed by especially introduced additives, is novel in regards to approaches and paradigm of the prior art.

The invention claimed is:

1. A single- or multilayer polymeric film, comprising
at least one (co)polyamide and
one or more water soluble polyvinyl alcohol (s) ($PVA_S$),
wherein said film additionally comprises a bonded polyvinyl alcohol ($PVA_B$), wherein said $PVA_B$
  i. is insoluble in water in a range of 18-100° C.,
  ii. is soluble in C1 to C3 carboxylic acids,
  iii. is capable of reaction with iodine, thereby producing a blue-colored product, and
  iv. is capable of reaction with a primary amine, thereby becoming water-soluble,
wherein a ratio $C_B/C_S$ is at least 0.05, wherein $C_B$ is a content of $PVA_B$ in said film and $C_S$ is a content of $PVA_S$ in the film, and
wherein the film is produced by a process comprising
one or more stages including thermal treatment and/or thermal-oxidative treatment of a PVA raw material with participation of elemental oxygen, resulting in at least one pelletized raw polymeric material comprising said $PVA_S$, and
melt (co)extrusion of said film,
wherein said at least one pelletized raw polymeric material used for the melt (co)extrusion comprises at least one of two components, including
  a. said $PVA_B$ in such concentration that the ratio $C_B/C_S \geq 0.05$, and
  b. said $PVA_S$ comprising
    a carbonyl-modified PVA ($PVA_{CO}$), the $PVA_{CO}$ being a product of the thermal treatment and/or thermal-oxidative treatment of the PVA raw material, a 4% aqueous solution of said $PVA_{CO}$ mixed with an excess of 2,4-dinitrophenylhydrazine having an optical density not less than 0.1 at the wavelength of 490 nm.

2. The film according to claim 1, wherein said film comprises from 30 to 98% of said at least one (co)polyamide, and from 2 to 70% of said one or more $PVA_S$.

3. The film according to claim 1, wherein said at least one pelletized raw polymeric material is obtained from said PVA raw material in form of commercial PVA raw material or from mixture of said commercial PVA raw material and said (co)polyamide by melt-kneading and extrusion, carried out in compliance with at least one of the following conditions:
  i. a melt dwelling time of said commercial PVA raw material or of a mixture of said commercial PVA raw material and said at least one (co)polyamide at a temperature above 160° C. is more than minimal time required to produce the pelletized raw polymeric material, and more than 270 seconds;
  ii. the PVA raw material comprises from 2 to 10% of at least one PVA decomposition catalyst selected from non-toxic weak alkali oxides, hydroxides or non-toxic salts of group I and group II metals; and
  iii. said commercial PVA raw material comprises said $PVA_{CO}$ or said commercial PVA raw material has been previously subjected to said thermal or thermal oxidative treatment resulting in pretreated PVA raw material comprising said $PVA_{CO}$.

4. The film according to claim 3, wherein said $PVA_B$ is formed at the stage of production of said pelletized raw material from mixture of said commercial PVA raw material or said pretreated PVA raw material and said (co)polyamide, during the period when said mixture is in the melted state, said period being not less than 20 seconds at a temperature of not less than 180° C., wherein said PVA raw materials comprise said $PVA_{CO}$.

5. The film according to claim 3, wherein said $PVA_B$ is formed at the stage of production of said pelletized raw material from mixture of said commercial PVA raw material or said pretreated PVA raw material and said (co)polyamide, during the period when said mixture is in the melted state, said period being not less than 20 seconds at a temperature of not less than 180° C., wherein said mixture comprises at least one PVA decomposition catalyst.

6. The film according to claim 3, wherein said commercial PVA raw material at least partially consists of macromolecules, comprising at least one of the structural elements selected from the group comprising carbon-carbon double bonds in the main chain, carbonyl groups with a carbon atom in the main chain, side chains of polyol with a length of 2-5 carbon atoms, and side chains of polyglycol with a molecular weight of not more 0.5 kDa.

7. The film according to claim 1, wherein said at least one(co)polyamide comprises, in its macromolecules, residues of at least one monomer selected from the group (i) comprising 4-aminobutyric acid, 5-aminovaleric acid, 6-aminocaproic acid, 11-aminoundecanoic acid, 12-aminolauric acid, tetramethylenethamine, hexamethylenethamine, dodecamethylenediamine, adipic acid, azelaic acid, sebacic acid and dodecanedioic acid, and also, if needed, not more than 15% w/w, of at least one monomer selected from the group (ii) comprising isophthalic acid, terephthalic acid, meta-xylylenediamine and para-xylylenethamine.

8. The film according to claim 1,
wherein said film additionally comprises not more than 50% of at least one thermoplastic polymer selected from the list comprising polyolefins, maleic anhydride grafted polyolefins, thermoplastic starch, water insoluble cellulose esters, polyamide-polyether block-copolymers, polyester-polyether block-copolymers, polyurethane-polyether block-copolymers, and
wherein these polymers, separately or in any combination, are present in any of the multiple layers of said film.

9. The film according to claim 1,
wherein said film additionally comprises not more than 50% of at least one water-soluble polymer selected from the list comprising polyvinylpyrrolidone, polyoxazoline, polyethylene oxide, and cellulose ethers, and wherein these polymers, separately or in any combination, are present in any of the multiple layers of said film.

10. The film according to claim 1, wherein said film additionally comprises not more than 20% of at least one functional additive selected from the list comprising pigments, colorants, highly dispersed fillers, coarsely dispersed fillers, including cellulose fibers, microcrystalline cellulose, cross-linked PVP, starch or dextrin, and also lubricants, slip additives, plasticizers, gas-emitting additives, stretching additives stretching aids, PVA decomposition rate additives, and antiblocking agents.

11. The film according to claim 1, wherein said film comprises from 1 to 12 layers.

12. The film according to claim 1, wherein said film is not oriented, or uniaxially or biaxially oriented and thermoset.

13. The film according to claim 1, wherein said film is made in the form of flat expanded sheet.

14. The film according to claim 1, wherein said film is made in the form of seamless tube.

15. The film according to claim 1, wherein the film is a casing for smoked frankfurters and sausages.

\* \* \* \* \*